July 19, 1949.　　　　E. L. JACOBS　　　　2,476,733
WEEDLESS RUBBER FISH BAIT

Filed June 14, 1945

INVENTOR.
Edward L. Jacobs
BY Victor J. Evans & Co.
ATTORNEYS

Patented July 19, 1949

2,476,733

UNITED STATES PATENT OFFICE 2,476,733

WEEDLESS RUBBER FISH BAIT

Edward L. Jacobs, Vicksburg, Mich.

Application June 14, 1945, Serial No. 599,464

2 Claims. (Cl. 43—42.1)

1

The invention relates to a fishing hook, and more especially to a weedless fish bait or lure.

The primary object of the invention is the provision of a hook of this character, wherein the point of the latter rides in an uppermost position and the same will not become entangled in trolling or casting when in motion through the water with weeds, brush, stones or other obstructions, the point of the hook being guarded, and the guard functioning as a lure.

Another object of the invention is the provision of a hook of this character, wherein the shank thereof carries a buoyant body or block, preferably made from rubber and from which rises a guard for the point of the hook, so that the latter will not catch into weeds or other entanglements, the buoyant body or block being an encasement for a weight which serves to maintain the point of the hook uppermost.

A further object of the invention is the provision of a hook of this character, wherein the guard for the point of the hook effects a hood-like protector therefor, and possesses flexibility to avoid interference in the functioning of the hook while in use.

A still further object of the invention is the provision of a hook of this character, which is simple in construction, thoroughly reliable and operative in use, strong, durable, neat in appearance, foulproof, readily and easily handled, does not interfere with trolling and casting, and is inexpensive to manufacture.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawings.

Similar reference characters indicate corresponding parts throughout the several views in the drawing.

Figure 1:
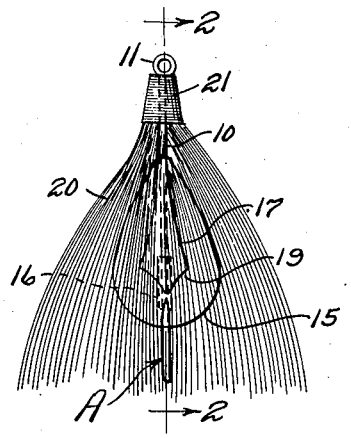
Figure 1 is a top plan view of the hook constructed in accordance with the invention.
Figure 2:
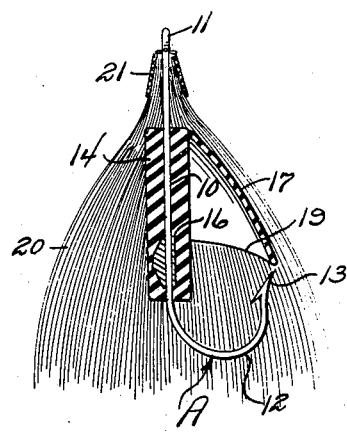
Figure 2 is a sectional view taken on the line 2—2 of Figure 1 looking in the direction of the arrows.
Figure 3:
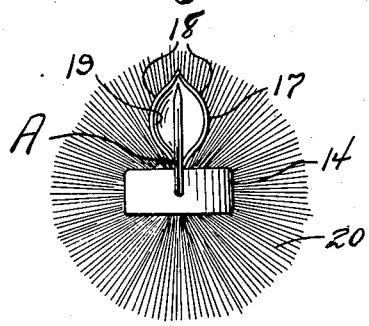
Figure 3 is an end elevation.

Referring to the drawing in detail, A designates generally the hook in its entirety constructed in accordance with the invention, and comprises a straight shank 10, having at one end an eye 11 for the attachment of the fishing line, not shown, while at the other end of such shank is a hooking bill 12, provided with a substantially arrow shape pointed tip 13, as usual.

Encasing a major portion of the shank 10 is the buoyant body or block 14, which is made of rubber and which has a tapered formation in the direction of the eye 11 and a rounded outer end 15,

2 next to the bill 12, the top and bottom surfaces of the body or block 14 being flat. Embedded in the body or block 14 close to the rounded end 15 and secured to the shank 10 is a weight 16 pendent in a direction to hold the bill 12 in an upright position when the hook A is used in trolling or casting.

Rising from the top surface of the body or block 14 in confronting relation to the bill 12 is a canopy-like hood 17 which is made of rubber also and which has the outwardly bulged side walls 18 and tapers in the direction of the eye 11, with an open end 19 next to the said hook bill 12, and the hood 17 being made of rubber is flexible. This hood 17 effects a guard to the bill 12, so that it will not become entangled in weeds, brush, stones or other obstructions, during the use of the hook A.

Around the guard hood 17 and the shank 10 in approaching relation to the bill 12 is an umbrella-like covering 20 which consists of bristles, badger-hair, feathers or any other tufted suitable material, and such covering being fixed to the shank 10 by a securing ferrule 21. This covering effects a lure and also serves to relieve the bill 12 from catching onto obstructions in the use of the hook A.

What is claimed is:

1. An article of the kind described, comprising a hook having a shank provided with a bill at one end, an elongated block-like buoyant body fitted to the shank, said body having a broad rounded lower end and the sides thereof tapering reversely to the bill to form a pointed upper end, a weight on the shank and embedded in the body close to the lower end thereof next to the bill to hold the latter in an upright position, and a canopy-like hood rising from the upper pointed end of the body in confronting relation to the bill.

2. An article of the kind described, comprising a hook having a shank provided with a bill at one end, an elongated block-like buoyant body fitted to the shank, said body having a broad rounded lower end and the sides thereof tapering reversely to the bill, to form a pointed upper end, a weight on the shank and embedded in the body close to the lower end thereof next to the bill to hold the latter in an upright position, a canopy-like hood rising from the upper pointed end of the body in confronting relation to the bill, and a bristle like tufted covering on the shank and about it and the hood.

EDWARD L. JACOBS.

REFERENCES CITED

The following references are of record in the file of this patent:

UNITED STATES PATENTS

| Number | Name | Date |
|---|---|---|
| Re. 13,828 | Lambert | Nov. 17, 1914 |
| Re. 21,553 | Bouton | Sept. 10, 1940 |
| 2,332,400 | Richardson | Oct. 19, 1943 |